United States Patent
Ni et al.

(10) Patent No.: US 10,244,556 B2
(45) Date of Patent: Mar. 26, 2019

(54) DATA SENDING METHOD AND DEVICE

(71) Applicant: Huawei Technologies Co., Ltd., Shenzhen (CN)

(72) Inventors: Rui Ni, Shenzhen (CN); Yalin Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 259 days.

(21) Appl. No.: 15/226,657

(22) Filed: Aug. 2, 2016

(65) Prior Publication Data
US 2016/0345363 A1 Nov. 24, 2016

Related U.S. Application Data

(63) Continuation of application No. PCT/CN2014/071979, filed on Feb. 11, 2014.

(51) Int. Cl.
*H04W 74/08* (2009.01)
*H04W 52/24* (2009.01)

(52) U.S. Cl.
CPC ..... *H04W 74/0816* (2013.01); *H04W 52/242* (2013.01); *H04W 52/245* (2013.01); *H04W 74/08* (2013.01)

(58) Field of Classification Search
CPC .................................................... H04W 74/08
See application file for complete search history.

(56) References Cited

U.S. PATENT DOCUMENTS

| 7,164,671 B2 | 1/2007 | del Prado et al. |
| 2006/0084460 A1* | 4/2006 | Matsuo ............... H04W 52/146 455/522 |
| 2006/0114867 A1* | 6/2006 | Du ..................... H04W 74/002 370/338 |

(Continued)

FOREIGN PATENT DOCUMENTS

| CN | 1780240 A | 5/2006 |
| CN | 102006630 A | 4/2011 |

(Continued)

OTHER PUBLICATIONS

IEEE Standards Association, IEEE Standard for Information Technology—Telecommunications and Information Exchange Between Systems; Local and Metropolitan Area Networks—Specific Requirements; Part 11: Wireless LAN Medium Access Control (MAC) and Physical Layer (PHY) Specifications, IEEE Computer Society, IEEE Std 802.11-2012 (Revision of IEEE Std 802.11-2007), Mar. 29, 2012, 2,793 pages.

*Primary Examiner* — Kevin M Cunningham
(74) *Attorney, Agent, or Firm* — Slater Matsil, LLP

(57) ABSTRACT

Embodiments provide a data sending method and device. The data sending method includes: determining, by a transmitting device, a busy/idle state of a wireless communications channel and a communication status of a receiving device before sending data to the receiving device, where the transmitting device is a wireless access node or the transmitting device is a station, and the receiving device is a wireless access node or the receiving device is a station. The method also includes sending, by the transmitting device, the data to the receiving device if the wireless communications channel is in a busy state and the receiving device is in an idle communication state.

12 Claims, 6 Drawing Sheets

---

301 — A transmitting device receives a first communication frame sent by a first wireless communications device, determines first receive power at which the first communication frame is received, and acquires first transmit power from the first communication frame; the transmitting device receives a second communication frame sent by a second wireless communications device, determines second receive power at which the second communication frame is received, and acquires a clear channel assessment threshold from the second communication frame 302 — The transmitting device determines a first path loss between the transmitting device and the first wireless communications device according to the first receive power and the first transmit power, and determines a second path loss between the transmitting device and the second wireless communications device according to the second receive power and the first transmit power 303 — The transmitting device determines, according to the first path loss, the second path loss, and the clear channel assessment threshold, transmit power needed for sending the data

(56) References Cited

U.S. PATENT DOCUMENTS

| | | | | |
|---|---|---|---|---|
| 2007/0030206 A1* | 2/2007 | Fontaine | ............ | H04B 7/0808 343/725 |
| 2011/0205961 A1* | 8/2011 | Santivanez | ....... | H04W 74/0816 370/328 |
| 2013/0235737 A1* | 9/2013 | Merlin | ............ | H04W 74/0808 370/252 |
| 2016/0174079 A1* | 6/2016 | Wang | ................... | H04W 52/50 455/454 |

FOREIGN PATENT DOCUMENTS

| | | | |
|---|---|---|---|
| CN | 102595449 | A | 7/2012 |
| EP | 1662708 | A1 | 5/2006 |
| EP | 2592871 | A1 | 5/2013 |
| JP | 2006157915 | A | 6/2006 |
| JP | 2012178694 | A | 9/2012 |
| JP | 2014504089 | A | 2/2014 |
| WO | 2007027442 | A2 | 3/2007 |
| WO | 2013070265 | A1 | 5/2013 |

\* cited by examiner

DATA SENDING METHOD AND DEVICE

CROSS-REFERENCE TO RELATED APPLICATIONS

This application is a continuation of International Patent Application No. PCT/CN2014/071979, filed on Feb. 11, 2014, which is hereby incorporated by reference in its entirety.

TECHNICAL FIELD

Embodiments relate to wireless communications technologies, and in particular, to a data sending method and device.

BACKGROUND

With rapid development of wireless communications technologies, Wireless Fidelity (WiFi) wireless communications devices based on the IEEE 802.11 protocol are rapidly popularized. Common WiFi wireless communications devices are: a smartphone, a tablet computer, a notebook computer, an intelligent electronic appliance, an intelligent sensor, and the like.

When multiple WiFi wireless communications devices that have a requirement for communication exist on a same wireless communications channel, these WiFi wireless communications devices compete for a right of use of the wireless communications channel according to a Carrier Sense Multiple Access/Collision Avoidance (CSMA/CA) mechanism, where the mechanism may be summarized as sensing first, waiting then, and sending at last. A specific process is: first, the WiFi wireless communications devices sense whether the wireless communications channel is currently in an "idle communications channel" state or in a "busy communications channel" state; if the wireless communications channel is currently in the "idle communications channel" state, a random number N is generated, and then, the wireless communications devices wait for N timeslot units; and if the wireless communications channel is currently in the "busy communications channel" state, the wireless communications devices remain inactive; after waiting for N timeslot units, the WiFi wireless communications devices immediately send data if the wireless communications channel is in the "idle communications channel" state.

In the prior art, when a WiFi wireless communications device is in a densely populated scenario such as an airport waiting hall, a lecture theater of a school, a conference and exhibition center, or a stadium, competition for a wireless communications channel by the WiFi wireless communications device is extremely fierce. According to the CSMA/CA mechanism, the WiFi wireless communications device remains inactive once sensing that the wireless communications channel is in the "busy communications channel" state, and most of WiFi wireless communications devices are in an inactive state due to frequent collision and waiting, so that usage efficiency of the wireless communications channel is low, and a network throughput is far less than a theoretically designed peak rate.

SUMMARY

Embodiments of the present invention provide a data sending method and device, to resolve a technical problem that usage efficiency of a wireless communications channel is low and a network throughput is not high.

A first aspect provides a data sending method. The method includes determining, by a transmitting device, a busy/idle state of a wireless communications channel and a communication status of a receiving device before sending data to the receiving device, where the transmitting device is a wireless access node or the transmitting device is a station, and the receiving device is a wireless access node or the receiving device is a station. The method also includes sending, by the transmitting device, the data to the receiving device if the wireless communications channel is in a busy state and the receiving device is in an idle communication state.

With reference to the first aspect, in a first implementable manner, the determining, by a transmitting device, a communication status of a receiving device includes: determining, by the transmitting device, the communication status of the receiving device by searching a communication status table, where the communication status table includes a communication pair that is performing communication on the wireless communications channel.

With reference to the first implementable manner of the first aspect, in a second implementable manner, the determining, by the transmitting device, the communication status of the receiving device by searching a communication status table includes: if the receiving device is recorded in the communication status table, determining that the receiving device is in a busy communication state; or if the receiving device is not recorded in the communication status table, determining that the receiving device is in the idle communication state.

With reference to the first implementable manner of the first aspect or the second implementable manner of the first aspect, in a third implementable manner, before the transmitting device searches the communication status table, the method further includes: receiving, by the transmitting device, a communication frame sent by at least one wireless communications device in the communication pair, where the at least one wireless communications device is a wireless access node or the at least one wireless communications device is a station; and maintaining, by the transmitting device, the communication status table according to the communication frame.

With reference to the third implementable manner of the first aspect, in a fourth implementable manner, the communication frame includes identification information of the two communication parties and duration over which the wireless communications channel is occupied; and the maintaining, by the transmitting device, the communication status table according to the communication frame includes: determining, by the transmitting device according to the identification information of the two communication parties, the communication pair that is performing communication on the wireless communications channel, and adding a correspondence of the communication pair into the communication status table; and when the duration over which the wireless communications channel is occupied expires, deleting, by the transmitting device, the correspondence of the communication pair from the communication status table.

With reference to the third implementable manner of the first aspect or the fourth implementable manner of the first aspect, in a fifth implementable manner, before the sending, by the transmitting device, the data to the receiving device, the method further includes: determining, by the transmitting device, first receive power at which a first communication frame is received and second receive power at which a second communication frame is received, acquiring first transmit power from the first communication frame, and acquiring a clear channel assessment threshold from the second communication frame, where the first communication frame is a communication frame that is sent by a first wireless communications device to a second wireless communications device in the communication pair, and the second communication frame is a communication frame that is sent by the second wireless communications device to the first wireless communications device in the communication pair; determining, by the transmitting device, a first path loss between the transmitting device and the first wireless communications device according to the first receive power and the first transmit power, and determining a second path loss between the transmitting device and the second wireless communications device according to the second receive power and the first transmit power; and determining, by the transmitting device according to the first path loss, the second path loss, and the clear channel assessment threshold, transmit power needed for sending the data.

With reference to the fifth implementable manner of the first aspect, in a sixth implementable manner, the first communication frame is a Request to Send frame, and the second communication frame is a Clear to Send frame.

With reference to the fifth implementable manner of the first aspect, in a seventh implementable manner, the first communication frame is a Transmit Power Control Request frame, and the second communication frame is a Transmit Power Control Report frame.

A second aspect provides a transmitting device. The device includes a determining module, configured to determine a busy/idle state of a wireless communications channel and a communication status of a receiving device before data is sent to the receiving device, where the transmitting device is a wireless access node or the transmitting device is a station, and the receiving device is a wireless access node or the receiving device is a station. The device also includes a sending module, configured to send the data to the receiving device if the wireless communications channel is in a busy state and the receiving device is in an idle communication state.

With reference to the second aspect, in a first implementable manner, the determining module is specifically configured to: determine the communication status of the receiving device by searching a communication status table, where the communication status table includes a communication pair that is performing communication on the wireless communications channel.

With reference to the first implementable manner of the second aspect, in a second implementable manner, the determining module is specifically configured to: if the receiving device is recorded in the communication status table, determine that the receiving device is in a busy communication state; or if the receiving device is not recorded in the communication status table, determine that the receiving device is in the idle communication state.

With reference to the first implementable manner of the second aspect or the second implementable manner of the second aspect, in a third implementable manner, the device further includes: a receiving module, configured to: before the determining module searches the communication status table, receive a communication frame sent by at least one wireless communications device in the communication pair, where the at least one wireless communications device is a wireless access node or the at least one wireless communications device is a station; and a maintaining module, configured to maintain the communication status table according to the communication frame before the determining module searches the communication status table.

With reference to the third implementable manner of the second aspect, in a fourth implementable manner, the communication frame includes identification information of the two communication parties and duration over which the wireless communications channel is occupied; and the maintaining module is specifically configured to: determine, according to the identification information of the two communication parties, the communication pair that is performing communication on the wireless communications channel, and add a correspondence of the communication pair into the communication status table; and when the duration over which the wireless communications channel is occupied expires, delete the correspondence of the communication pair from the communication status table.

With reference to the third implementable manner of the second aspect or the fourth implementable manner of the second aspect, in a fifth implementable manner, the determining module is further configured to: before data is sent to the receiving device, determine first receive power at which a first communication frame is received and second receive power at which a second communication frame is received, acquire first transmit power from the first communication frame, and acquire a clear channel assessment threshold from the second communication frame, where the first communication frame is a communication frame that is sent by a first wireless communications device to a second wireless communications device in the communication pair, and the second communication frame is a communication frame that is sent by the second wireless communications device to the first wireless communications device in the communication pair; determine a first path loss between the transmitting device and the first wireless communications device according to the first receive power and the first transmit power, and determine a second path loss between the transmitting device and the second wireless communications device according to the second receive power and the first transmit power; and determine, according to the first path loss, the second path loss, and the clear channel assessment threshold, transmit power needed for sending the data.

With reference to the fifth implementable manner of the second aspect, in a sixth implementable manner, the first communication frame is a Request to Send frame, and the second communication frame is a Clear to Send frame.

With reference to the fifth implementable manner of the second aspect, in a seventh implementable manner, the first communication frame is a Transmit Power Control Request frame, and the second communication frame is a Transmit Power Control Report frame.

A third aspect provides a transmitting device, including: a processor, configured to determine a busy/idle state of a wireless communications channel and a communication status of a receiving device before data is sent to the receiving device, where the transmitting device is a wireless access node or the transmitting device is a station, and the receiving device is a wireless access node or the receiving device is a station. The device also includes a transmitter, configured to send the data to the receiving device if the wireless communications channel is in a busy state and the receiving device is in an idle communication state.

With reference to the third aspect, in a first implementable manner, the processor is further configured to: determine the communication status of the receiving device by searching a communication status table, where the communication status table includes a communication pair that is performing communication on the wireless communications channel.

With reference to the first implementable manner of the third aspect, in a second implementable manner, the processor is further configured to: if the receiving device is recorded in the communication status table, determine that the receiving device is in a busy communication state; or if the receiving device is not recorded in the communication status table, determine that the receiving device is in the idle communication state.

With reference to the first implementable manner of the third aspect or the second implementable manner of the third aspect, in a third implementable manner, the device further includes: a receiver, configured to: before the processor searches the communication status table, receive a communication frame sent by at least one wireless communications device in the communication pair, where the at least one wireless communications device is a wireless access node or the at least one wireless communications device is a station; and the processor is further configured to maintain the communication status table according to the communication frame before the processor searches the communication status table.

With reference to the third implementable manner of the third aspect, in a fourth implementable manner, the communication frame includes identification information of the two communication parties and duration over which the wireless communications channel is occupied; and the processor is specifically configured to: determine, according to the identification information of the two communication parties, the communication pair that is performing communication on the wireless communications channel, and add a correspondence of the communication pair into the communication status table; and when the duration over which the wireless communications channel is occupied expires, delete the correspondence of the communication pair from the communication status table.

With reference to the third implementable manner of the third aspect or the fourth implementable manner of the third aspect, in a fifth implementable manner, the processor is further configured to: before data is sent to the receiving device, determine first receive power at which a first communication frame is received and second receive power at which a second communication frame is received, acquire first transmit power from the first communication frame, and acquire a clear channel assessment threshold from the second communication frame, where the first communication frame is a communication frame that is sent by a first wireless communications device to a second wireless communications device in the communication pair, and the second communication frame is a communication frame that is sent by the second wireless communications device to the first wireless communications device in the communication pair; determine a first path loss between the transmitting device and the first wireless communications device according to the first receive power and the first transmit power, and determine a second path loss between the transmitting device and the second wireless communications device according to the second receive power and the first transmit power; and determine, according to the first path loss, the second path loss, and the clear channel assessment threshold, transmit power needed for sending the data.

With reference to the fifth implementable manner of the third aspect, in a sixth implementable manner, the first communication frame is a Request to Send frame, and the second communication frame is a Clear to Send frame.

With reference to the fifth implementable manner of the third aspect, in a seventh implementable manner, the first communication frame is a Transmit Power Control Request frame, and the second communication frame is a Transmit Power Control Report frame.

Technical effects of the embodiments are as follows: whether to send data is determined by determining a busy/idle state of a wireless communications channel and a communication status of a receiving device; specifically, a transmitting device sends data when the wireless communications channel is in a busy state and the receiving device is in an idle communication state, which implements data sending when the wireless communications channel is in the busy state, and resolves a technical problem that usage efficiency of the wireless communications channel is low and a network throughput is not high.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
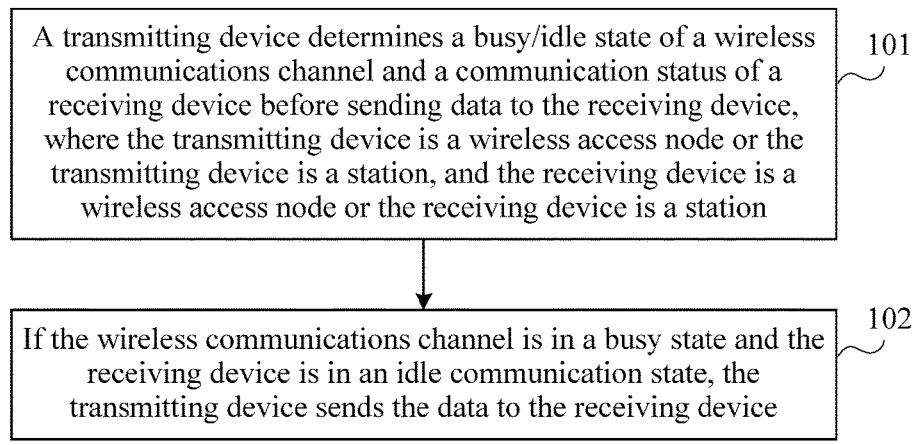
FIG. 1 is a flowchart of a data sending method according to Embodiment.

FIG. 1 is a flowchart of a data sending method according to Embodiment 1. As shown in FIG. 1, the method in this embodiment may include the following process.

Step 101: A transmitting device determines a busy/idle state of a wireless communications channel and a communication status of a receiving device before sending data to the receiving device, where the transmitting device is a wireless access node or the transmitting device is a station, and the receiving device is a wireless access node or the receiving device is a station.

When determining that the wireless communications channel is in an idle state, the transmitting device sends the data, which is the same as a data sending method in the prior art, and details are not described herein again. It should be noted that, the wireless communications channel mentioned in this embodiment is a wireless frequency band shared by multiple wireless communications devices, unlike a communications channel in mobile phone wireless cellular communication, in which an entire wireless frequency band is segmented into several sub-channels that are respectively used by mobile phones. The communication status of the receiving device is whether the receiving device is performing communication with another wireless communications device. If the receiving device is performing communication with another wireless communications device, the communication status of the receiving device is busy; and if the receiving device is not performing communication with another wireless communications device, the communication status of the receiving device is idle. When the transmitting device determines that the wireless communications channel is in a busy state, the transmitting device further determines the communication status of the receiving device, that is, further determines whether the receiving device is performing communication with another wireless communications device. It should further be noted that, the busy/idle state of the communications channel described in this embodiment is corresponding to a busy/idle state of a communications channel in the prior art, and a method for determining the busy/idle state of the wireless communications channel is the same as that in the prior art, and details are not described herein again.

The transmitting device may be a wireless access point (AP) of a wireless local area network (WLAN), or may be a station (STA) (for example, a smartphone with a WiFi wireless network interface card, a tablet computer with a WiFi wireless network interface card, a computer with a WiFi wireless network interface card, a smart appliance with a WiFi wireless network interface card, or an intelligent sensor). The receiving device may be a wireless access node, or may be a station. The station (STA) is, for example, a smartphone with a WiFi wireless network interface card, a tablet computer with a WiFi wireless network interface card, a computer with a WiFi wireless network interface card, a smart appliance with a WiFi wireless network interface card, or an intelligent sensor. Specifically, that the transmitting device sends data to the receiving device may be that a wireless access node sends the data to a station, may be that a station sends the data to a wireless access node, may be that a station sends the data to a station, or may be that a wireless access point sends the data to a wireless access node, which is not limited in this embodiment.

Step 102: If the wireless communications channel is in a busy state and the receiving device is in an idle communication state, the transmitting device sends the data to the receiving device.

When the transmitting device determines that the wireless communications channel is in the busy state, and further determines that the receiving device does not communicate with another communications device, the transmitting device sends the data. That is, even though the wireless communications channel is in the busy state, the transmitting device may also send the data.

In this embodiment, whether to send data is determined by determining a busy/idle state of a wireless communications channel and a communication status of a receiving device. Specifically, a transmitting device sends data when the wireless communications channel is in a busy state and the receiving device is in an idle communication state, which implements data sending when the wireless communications channel is in the busy state, and resolves a technical problem that usage efficiency of the wireless communications channel is low and a network throughput is not high.

The following describes in detail the technical solution of the method embodiment shown in FIG. 1 with reference to several specific embodiments.

Figure 2:
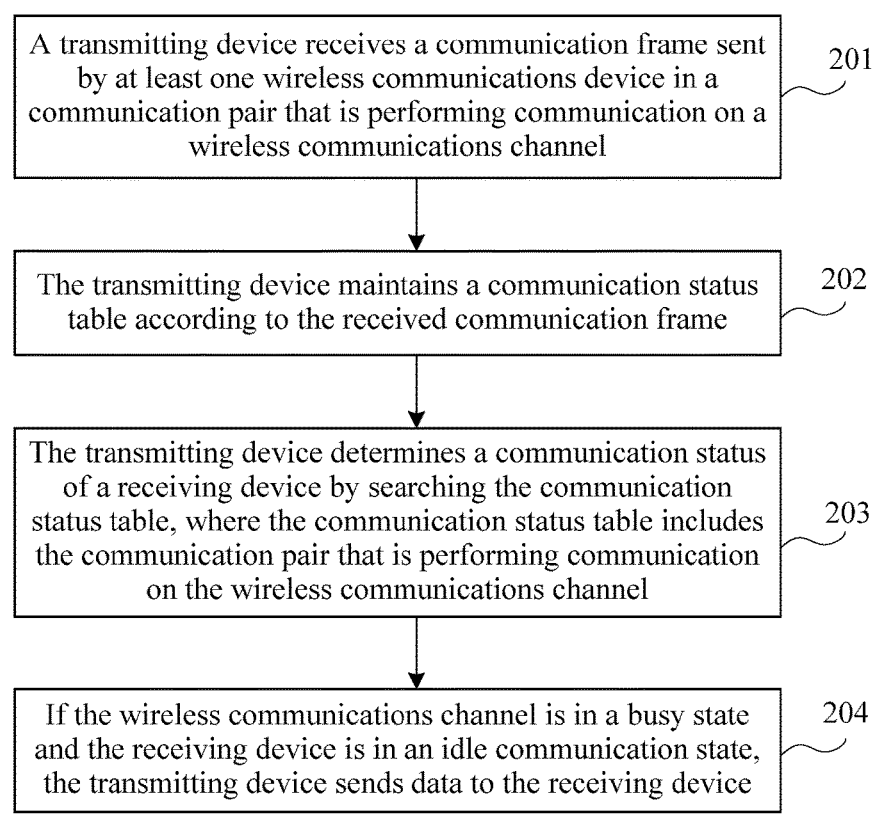
FIG. 2 is a flowchart of a data sending method according to Embodiment 2.

FIG. 2 is a flowchart of a data sending method according to Embodiment 2. As shown in FIG. 2, the method in this embodiment may include the following steps.

Step 201: A transmitting device receives a communication frame sent by at least one wireless communications device in a communication pair that is performing communication on a wireless communications channel.

Before performing data transmission, the communication pair broadcasts a communication frame that is used to establish a connection. Because the communication frame is broadcast, another wireless communications device on the wireless communications channel may also receive the communication frame, so that the another wireless communications device on the wireless communications channel can learn that a wireless communications device is going to occupy the wireless communications channel for data transmission. The communication frame in this embodiment includes identification information of the two communication parties, such as Media Access Control (MAC) addresses of the two communication parties, so that the another wireless communications device on the wireless communications channel can determine, by using at least one communication frame, the two communication parties that are going to perform data transmission.

Step 202: The transmitting device maintains a communication status table according to the received communication frame.

The communication frame includes but is not limited to: the identification information of the two communication parties, and duration over which the wireless communications channel is occupied. By using the identification information of the two communication parties that is carried in the communication frame, such as the MAC addresses, the another wireless communications device on the wireless communications channel including the transmitting device in this embodiment can learn about two specific wireless communications devices that are the two communication parties that are going to perform data transmission. By using the duration over which the wireless communications channel is occupied that is carried in the communication frame, the another wireless communications device on the wireless communications channel including the transmitting device in this embodiment can learn duration over which the wireless communications channel is occupied by the two wireless communications devices. The transmitting device dynamically maintains the communication status table according to the communication frame that includes the identification information of the two communication parties and the duration over which the wireless communications channel is occupied.

Figure 3:
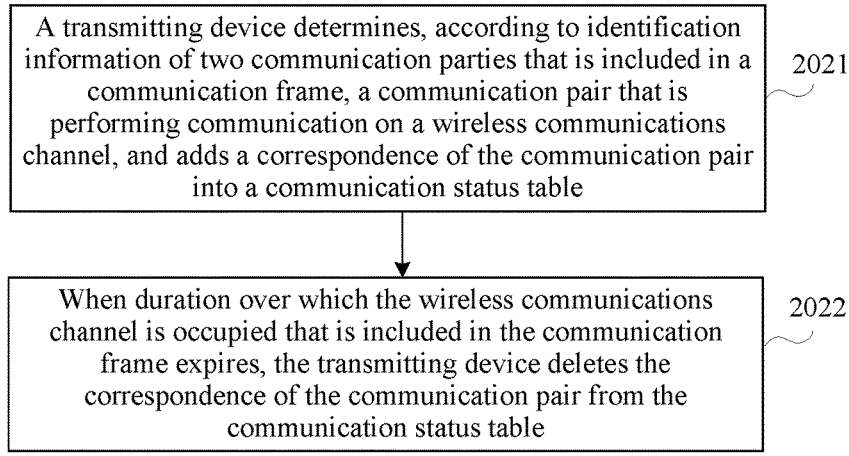
FIG. 3 is another flowchart of a data sending method according to Embodiment 2.

As shown in FIG. 3, step 202 specifically includes step 2021 and step 2022.

Step 2021: The transmitting device determines, according to the identification information of the two communication parties that is included in the communication frame, the communication pair that is performing communication on the wireless communications channel, and adds a correspondence of the communication pair into the communication status table.

When receiving the communication frame, the transmitting device adds the correspondence of the communication pair into the communication status table according to the identification information of the two communication parties that is included in the communication frame, that is, accordingly adds the identification information of the two wireless communications devices that are performing communication on the wireless communications channel into the communication status table.

Step 2022: When the duration over which the wireless communications channel is occupied that is included in the communication frame expires, the transmitting device deletes the correspondence of the communication pair from the communication status table.

When adding the correspondence of the communication pair into the communication status table, the transmitting device may further set a timer for the correspondence of the communication pair according to the duration over which the wireless communications channel is occupied by the communication pair, where a time period is set to the duration over which the wireless communications channel is occupied, and when timing ends, the correspondence of the communication pair is deleted from the communication status table. A quantity of communication pairs in the communication status table may be zero, or may be a positive integer. In addition, a data frame transmitted in the communication pair also includes the duration over which the wireless communications channel is occupied. The transmitting device may further update timing duration of the timer according to the duration over which the wireless communications channel is occupied that is in the data frame.

Step 203: The transmitting device determines a communication status of a receiving device by searching the communication status table, where the communication status table includes the communication pair that is performing communication on the wireless communications channel.

Before sending data, the transmitting device traverses the communication status table to check whether the receiving device is recorded in the communication status table. If the receiving device is recorded in the communication status table, the receiving device is communicating with another communications device and is in a busy communication state. If the receiving device is not recorded in the communication status table, the receiving device is not communicating with another communications device and is in an idle communication state.

Step 204: If the wireless communications channel is in a busy state and the receiving device is in an idle communication state, the transmitting device sends data to the receiving device.

The transmitting device queries the communication status table; if the receiving device is recorded in the communication status table, the receiving device is communicating with another communications device and is in the busy communication state, and the transmitting device does not send the data to the receiving device; or if the receiving device is not recorded in the communication status table, the receiving device is not communicating with another communications device and is in the idle communication state, and the transmitting device sends the data to the receiving device. It should be noted that, a busy/idle state of the wireless communications channel described in this embodiment is corresponding to a busy/idle state of a communications channel in the prior art, and a method for determining the busy/idle state of the communications channel is the same as that in the prior art, and details are not described herein again. It should further be noted that, when the transmitting device is in a communications channel idle state, the transmitting device does not need to query the communication status table and may use any method in the prior art to send the data to the receiving device.

In this embodiment, by querying a communication status table that is dynamically maintained, a transmitting device may learn a current communication status of a receiving device. The status of the receiving device is more accurate, which ensures that data sent by the transmitting device can be correctly received by the receiving device.

Figure 4:
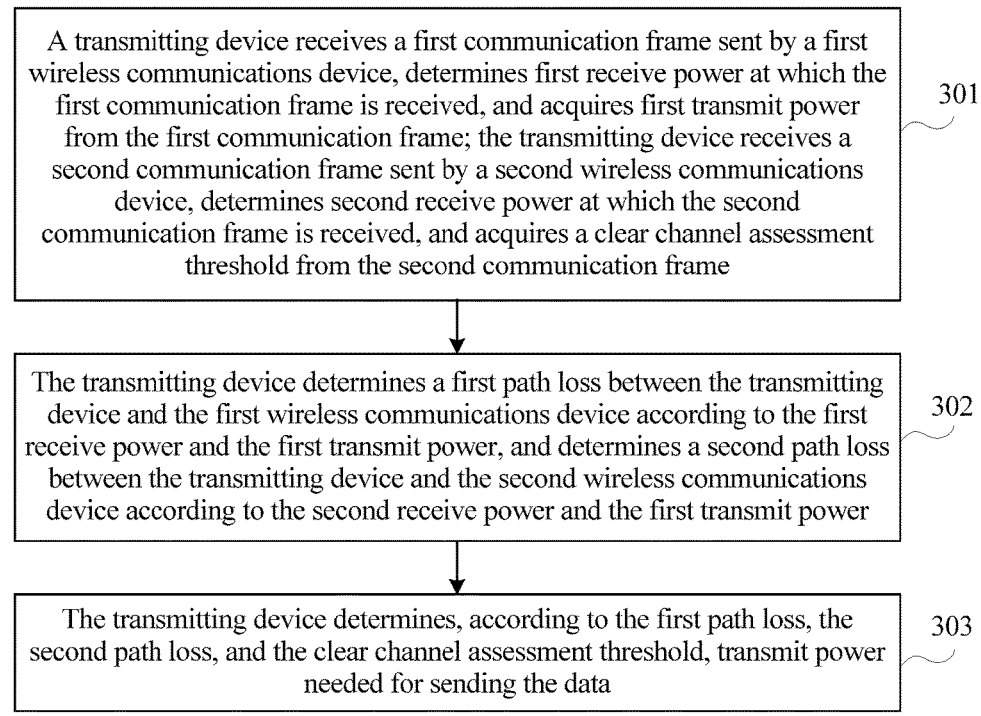
FIG. 4 is a flowchart of a data sending method according to Embodiment 3.

FIG. 4 is a flowchart of a data sending method according to Embodiment 3. As shown in FIG. 4, this embodiment differs from Embodiment 2 in that: after determining to send data to a receiving device, a transmitting device further calculates power that is properly used to send the data. On the basis of the foregoing embodiment, the method in this embodiment may specifically include the following steps.

Step 301: The transmitting device receives a first communication frame sent by a first wireless communications device, determines first receive power at which the first communication frame is received, and acquires first transmit power from the first communication frame; the transmitting device receives a second communication frame sent by a second wireless communications device, determines second receive power at which the second communication frame is received, and acquires a clear channel assessment threshold from the second communication frame.

Specifically, the transmitting device needs to receive the first communication frame and the second communication frame sent by the two communication parties respectively. The first wireless communications device and the second wireless communications device form a communication pair. The first wireless communications device sends the first communication frame to the second wireless communications device at the first transmit power. After the second wireless communications device receives the first communication frame, because the first transmit power used by the first wireless communications device to send the first communication frame is carried in the first communication frame, the second wireless communications device may acquire, from the first communication frame, the first transmit power used by the first wireless communications device to send the first communication frame, and the second wireless communications device also sends the second communication frame at the first transmit power. The first communication frame includes the first transmit power used by the first wireless communications device to send the first communication frame, and the second communication frame includes the clear channel assessment threshold, where the clear channel assessment threshold included in the second communication frame is a clear channel assessment threshold negotiated by the communication pair. The clear channel assessment threshold is used to indicate a level of tolerance of the wireless communications devices to an interfering signal on a wireless communications channel. It should be noted that, different methods may be used to distinguish between the first communication frame and the second communication frame. For example, the first communication frame carries MAC addresses of the two communication parties, and the second communication frame carries only a MAC address of the first wireless communications device; or a flag bit is set in the first communication frame and the second communication frame, and the first communication frame and the second communication frame are distinguished according to different flag bit values. Because the first communication frame and the second communication frame are broadcast, the transmitting device may receive the first communication frame and the second communication frame. The transmitting device receives the first communication frame and the second communication frame, and measures receive power used to receive the first communication frame and receive power used to receive the second communication frame, which are respectively referred to as the first receive power and the second receive power in this embodiment. Specifically, the receive power used by the transmitting device to receive the first communication frame is the first receive power, and the receive power used by the transmitting device to receive the second communication frame is the second receive power. After receiving the first communication frame and the second communication frame, the transmitting device may acquire the first transmit power from the first communication frame and the clear channel assessment threshold from the second communication frame.

Step 302: The transmitting device determines a first path loss between the transmitting device and the first wireless communications device according to the first receive power and the first transmit power, and determines a second path loss between the transmitting device and the second wireless communications device according to the second receive power and the first transmit power.

A difference between the first transmit power and the first receive power is the first path loss, which indicates a power loss in transmitting the first communication frame from the second wireless communications device to the transmitting device. Because the second wireless communications device sends the second communication frame at the first transmit power, a difference between the first transmit power and the second receive power is the second path loss, which indicates a power loss in transmitting the second communication frame from the second wireless communications device to the transmitting device.

Step 303: The transmitting device determines, according to the first path loss, the second path loss, and the clear channel assessment threshold, transmit power needed for sending the data.

Specifically, the transmit power needed for sending the data may be determined in the following manner: The first path loss is recorded as PL_1, the second path loss is recorded as PL_2, the clear channel assessment threshold is recorded as C1, and the transmit power needed for sending the data is recorded as P_limit, where P_limit=MIN(PL_1, PL_2)+C1. A value of P_limit obtained by calculation is a value of the transmit power used by the transmitting device to send the data.

When multiple communication pairs that are performing communication exist on the communications channel, corresponding first path losses, second path losses, clear channel assessment thresholds are stored in a path loss vector table <TX_PL(n), RX_PL(n), C(n)>, where n=1, 2, ..., N. The transmit power needed for sending the data is determined by using the following code, where TX_PL(n) is corresponding to the first path losses, RX_PL(n) is corresponding to the second path losses, C(n) is corresponding to the clear channel assessment thresholds, and n indicates an $n^{th}$ communication pair.

```
set P_limit = 30 dB /*initiating P_limit, which is set to 30dB*/
for n = 1 to n /*traversing n communication pairs*/
    P_temp = MIN { TX_PL(n), RX_PL(n) } + C(n)
    if P_limit > P_temp
        P_limit = P_temp
    end
end
```

The first communication frame may be a Request to Send frame (RTS frame), or the first communication frame may be a Transmit Power Control Request frame (TPC Request frame). The second communication frame may be a Clear to Send frame (CTS frame), or the second communication frame may be a Transmit Power Control Report frame (TPC Report frame).

Figure 5:
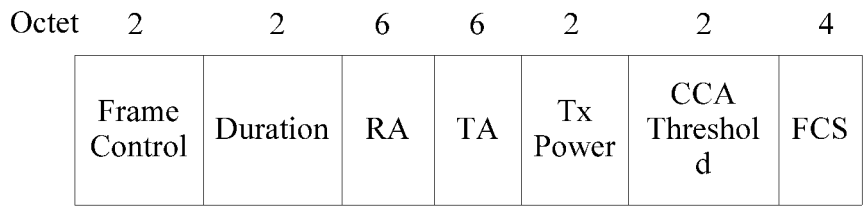
FIG. 5 is a frame format of a Request to Send frame of a data sending method according to Embodiment 3.

Specifically, the RTS frame in this embodiment may use a frame format shown in FIG. 5. The frame format includes: a Frame Control field, a Duration field, an RA field, a TA field, a Tx Power field, a Clear Channel Assessment (CCA) Threshold field, and a Frame Check Sequence (FCS) field. The RA field is filled with a MAC address of the second wireless communications device, the TA field is filled with the MAC address of the first wireless communications device, and the Tx Power field is filled with the first transmit power. Compared with an RTS frame in the prior art, the RTS frame in this embodiment is added with the Tx Power field and the CCA Threshold field.

Figure 6:
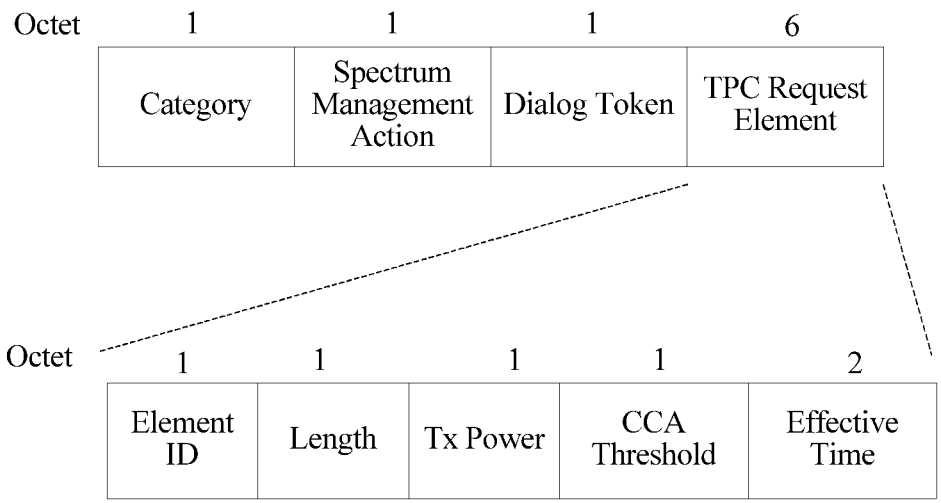
FIG. 6 is a frame format of a Transmit Power Control Request frame of a data sending method according to Embodiment 3.

The TPC Request frame in this embodiment may use a frame format shown in FIG. 6. The frame format includes: a Category field, a Spectrum Management Action (SMA) field, a Dialog Token field, a TPC Request Element field, an Element ID field, a Length field, a Tx Power field, a CCA Threshold field, and an Effective Time field. The Tx Power field is filled with the first transmit power. It should be noted that, a TPC Request frame in the prior art carries the MAC addresses of the two communication parties (not shown in the figure). In this embodiment, the MAC addresses of the first wireless communications device and the second wireless communications device are filled into corresponding fields according to a filling rule in the prior art, and details are not described herein again. Compared with the TPC Request frame in the prior art, the TPC Request frame in this embodiment is added with the Tx Power field, the CCA Threshold field, and the Effective Time field that are in the TPC Request Element field.

Figure 7:
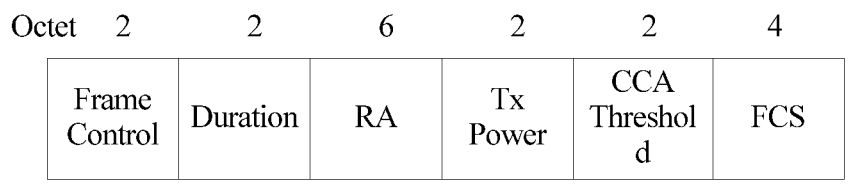
FIG. 7 is a frame format of a Clear to Send frame of a data sending method according to Embodiment 3.

The CTS frame in this embodiment may use a frame format shown in FIG. 7. The frame format includes: a Frame Control field, a Duration field, an RA field, a Tx Power field, a CCA Threshold field, and an FCS field. The RA field is filled with the MAC address of the second wireless communications device, and the CCA Threshold field is filled with the clear channel assessment threshold. Compared with a CTS frame in the prior art, the CTS frame in this embodiment is added with the Tx Power field and the CCA Threshold field.

Figure 8:
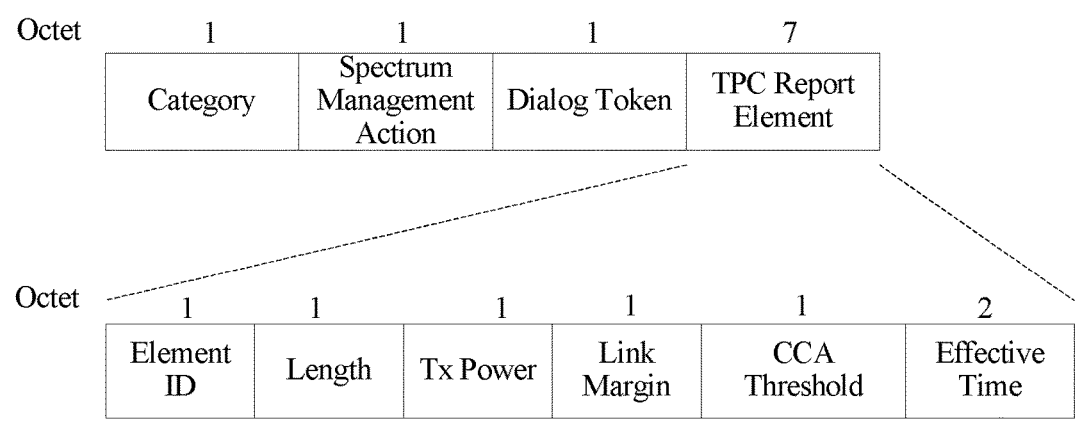
FIG. 8 is a frame format of a Transmit Power Control Report frame of a data sending method according to Embodiment 3.

The TPC Report frame in this embodiment may use a frame format shown in FIG. 8. The frame format includes:

a Category field, a Spectrum Management Action (SMA) field, a Dialog Token field, a TPC Report element field, an Element ID field, a Length field, a Tx Power field, a Link Margin field, a CCA Threshold field, and an Effective Time field. The CCA Threshold field is filled with the clear channel assessment threshold. It should be noted that, a TPC Report frame in the prior art carries the MAC addresses of the two communication parties (not shown in the figure). In this embodiment, the MAC addresses of the first wireless communications device and the second wireless communications device are filled into corresponding fields according to a filling rule in the prior art, and details are not described herein again. Compared with the TPC Report frame in the prior art, the TPC Report frame in this embodiment is added with the Tx Power field, the CCA Threshold field, and the Effective Time field that are in the TPC Report Element field.

Persons skilled in the art may understand that when the first communication frame is an RTS frame, the second communication frame is a CTS frame corresponding to the RTS frame; and when the first communication frame is a TPC Request frame, the second communication frame is a TPC Report frame corresponding to the TPC Request frame.

After receiving the first communication frame and the second communication frame, the transmitting device may acquire the first transmit power, the second transmit power, and the clear channel assessment threshold from corresponding fields, to calculate proper transmit power needed by the transmitting device to send the data to the receiving device.

That the first communication frame is an RTS frame and the second communication frame is a CTS frame is used as an example to describe a process in which the first wireless communications device negotiates the clear channel assessment threshold with the second wireless communications device.

Step a: The first wireless communications device uses the first transmit power that is recorded as P1 to send the RTS frame to the second wireless communications device, where P1 is carried in a Tx Power field of the RTS frame. In addition, according to an empirical value, the first wireless communications device sets its receive threshold that is recorded as C1, where C1 is carried in a CCA Threshold field of the RTS frame.

Step b: The second wireless communications device receives the RTS frame and measures power at which the RTS frame is received, where the power is recorded as P3. The second wireless communications device calculates a path loss (Path Loss) from the first wireless communications device to the second wireless communications device, and a calculation formula is PL_A=P1−P3; then, the second wireless communications device obtains, by calculation according to a receive signal-to-noise ratio SNR_n and receive noise intensity $N_o$ that are requested by a selected $n^{th}$ stage modulation and coding scheme (MCS for short), corresponding target signal strength that is recorded as P_target, and a calculation formula is $P\_target=N_o*10^{SNR\_n/10}$; subsequently, the second wireless communications device obtains largest power P2 of subsequent data communication by calculation by using a formula P2=min(P1, P_target+PL_A), where a value of P2 is carried in a Tx Power field of the CTS frame. Then, the second wireless communications device uses a formula 10*log(P2*C2)=Constant value to calculate the clear channel assessment threshold that is recorded as C2, where the constant value is an empirical value (in a unit of dB), and a value of which may be set to −1800 in Embodiment 1. Further, the second wireless communications device sets its CCA threshold to a value of C2, and carries the value of C2 in a CCA Threshold field of the CTS frame. Finally, the second wireless communications device sends the CTS frame at power P1.

Step c: The first wireless communications device receives the CTS frame sent by the second wireless communications device, sets a clear channel assessment threshold of the first wireless communications device according to C2 carried in the CCA Threshold field of the CTS frame, and sends a subsequent data frame according to the P2 value carried in the Tx Power field of the CTS frame.

After determining to send data to the receiving device, the transmitting device may send the data by using largest power defined by a protocol in the prior art, and may further calculate, by using a power calculation method provided in this embodiment, transmit power used to send the data. Sending the data by using the largest power defined by the protocol in the prior art may affect another communication pair that is performing communication on the communications channel, but obtaining data transmit power by using the calculation method in this embodiment may avoid impact on a communication pair that is performing communication on the communications channel.

Figure 9:
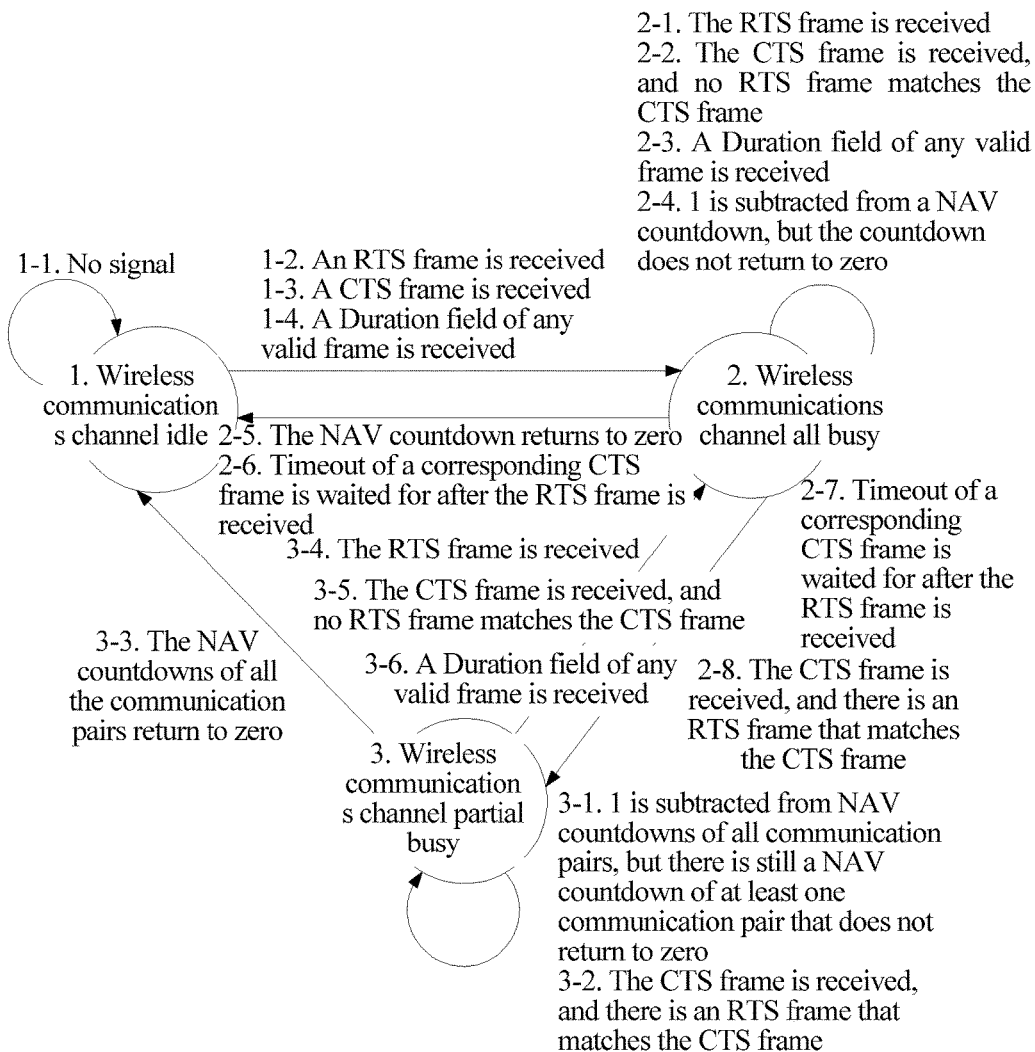
FIG. 9 is a state machine of a transmitting device of a data sending method according to an embodiment.

Specifically, FIG. 9 is a state machine of a transmitting device of a data sending method according to an embodiment.

As shown in FIG. 9, the state machine includes three states: wireless communications channel idle, wireless communications channel partial busy, and wireless communications channel all busy. Wireless communications channel idle is: no wireless communications device currently occupies the wireless communications channel for communication, which is corresponding to wireless communications channel idle in the prior art. Wireless communications channel partial busy is: the wireless communications channel is busy, and a receiving device is in an idle communication state. Wireless communications channel all busy is: the wireless communications channel is busy, and the receiving device is in a busy communication state.

In the wireless communications channel idle state, the transmitting device may send data freely, and a state transition condition of the transmitting device is as follows.

1-1. If no wireless communications device currently occupies the wireless communications channel for communication, that is, there is no signal, the wireless communications channel idle state remains unchanged.

1-2. If an RTS frame is received, the wireless communications channel idle state transits to the wireless communications channel all busy state.

1-3. If a CTS frame is received, the wireless communications channel idle state transits to the wireless communications channel all busy state.

1-4. If a Duration field of any valid frame is received, the wireless communications channel idle state transits to the wireless communications channel all busy state.

In the wireless communications channel all busy state, the transmitting device does not send any data, does not send the RTS frame, and does not send the CTS frame, and the state transition condition of the transmitting device is as follows:

2-1. If the RTS frame is received, the wireless communications channel all busy state remains unchanged.

2-2. If the CTS frame is received, and no RTS frame matches the CTS frame, the wireless communications channel all busy state remains unchanged.

2-3. If a Duration field of any valid frame is received, the wireless communications channel all busy state remains unchanged.

2-4. If 1 is subtracted from a network allocation vector (NAV for short) countdown, but the countdown does not return to zero, the wireless communications channel all busy state remains unchanged; a NAV register exists at a MAC layer of a wireless communications device, where the NAV register may be set according to a value in a Duration field carried in a communication frame, and when a value in the NAV register changes into zero, counting down ends.

2-5. If the NAV countdown returns to zero, the wireless communications channel all busy state transits to the wireless communications channel idle state.

2-6. If timeout of a corresponding CTS frame is waited for after the RTS frame is received (if a previous state is channel idle), the wireless communications channel all busy state transits to the wireless communications channel idle state.

2-7. If timeout of a corresponding CTS frame is waited for after the RTS frame is received (if a previous state is channel partial busy), the wireless communications channel all busy state transits to the channel partial busy state.

2-8. If the CTS frame is received, and there is an RTS frame that matches the CTS frame, the wireless communications channel all busy state transits to the channel partial busy state.

In the wireless communications channel partial busy state, before sending the data to the receiving device, the transmitting device needs to check whether communication can be performed on the premise that an existing communication pair is not affected. If the existing communication pair is not affected, communication can be performed, and if the existing communication pair is affected, communication cannot be performed. A state transition condition of the transmitting device is as follows.

3-1. If 1 is subtracted from NAV countdowns of all communication pairs, but there is still a NAV countdown of at least one communication pair that does not return to zero, the channel partial busy state remains unchanged.

3-2. If the CTS frame is received, and there is an RTS frame that matches the CTS frame, the channel partial busy state remains unchanged.

3-3. If the NAV countdowns of all the communication pairs return to zero, the wireless communications channel partial busy state transits to the wireless communications channel idle state.

3-4. If the RTS frame is received, the wireless communications channel partial busy state transits to the wireless communications channel all busy state.

3-5. If the CTS frame is received, and no RTS frame matches the CTS frame, the wireless communications channel partial busy state transits to the wireless communications channel all busy state.

3-6. If a Duration field of any valid frame is received, the wireless communications channel partial busy state transits to the wireless communications channel all busy state.

It should be noted that in FIG. 9, that the first communication frame is the RTS frame and the second communication frame is the CTS frame is exemplary.

Figure 10:
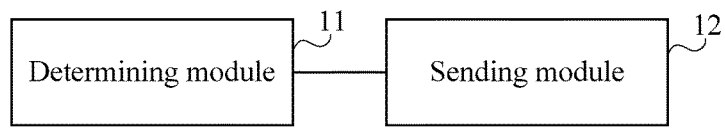
FIG. 10 is a schematic structural diagram of a transmitting device according to Embodiment 1.

In this embodiment, data sending when a wireless communications channel is in a busy state is implemented by controlling power at which a transmitting device sends data, which resolves a technical problem that a throughput of the wireless communications channel is not high, and further avoids mutual interference between multiple communication pairs that simultaneously perform communication on the wireless communications channel FIG. 10 is a schematic structural diagram of a transmitting device according to Embodiment 1 of the present invention.

As shown in FIG. 10, the transmitting device in this embodiment may include: a determining module n and a sending module 12.

The determining module 11 is configured to determine a busy/idle state of a wireless communications channel and a communication status of a receiving device before the transmitting device sends data to the receiving device, where the transmitting device is a wireless access node or the transmitting device is a station, and the receiving device is a wireless access node or the receiving device is a station.

The sending module 12 is configured to send the data to the receiving device if the wireless communications channel is in a busy state and the receiving device is in an idle communication state.

The transmitting device in this embodiment may be configured to execute the technical solution of the method embodiment shown in FIG. 1. Implementation principles and technical effects thereof are similar and are not described herein again.

Figure 11:
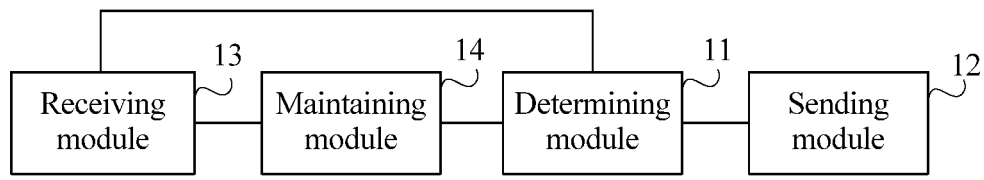
FIG. 11 is a schematic structural diagram of a transmitting device according to Embodiment 2.

FIG. 11 is a schematic structural diagram of a transmitting device according to Embodiment 2 of the present invention. As shown in FIG. 11, on the basis of the transmitting device structure shown in FIG. 9, the transmitting device in this embodiment may further include: a receiving module 13 and a maintaining module 14.

The determining module 11 is further configured to determine the communication status of the receiving device by searching a communication status table, where the communication status table includes a communication pair that is performing communication on the wireless communications channel.

The receiving module 13 is configured to: before the determining module 11 searches the communication status table, receive a communication frame sent by at least one wireless communications device in the communication pair, where the at least one wireless communications device is a wireless access node or the at least one wireless communications device is a station.

The maintaining module 14 is configured to: before the determining module n searches the communication status table, maintain the communication status table according to the communication frame; determine, according to identification information of the two communication parties, the communication pair that is performing communication on the wireless communications channel, and add a correspondence of the communication pair into the communication status table; and when duration over which the wireless communications channel is occupied expires, delete the correspondence of the communication pair from the communication status table.

The transmitting device in this embodiment may be configured to execute the technical solutions of the method embodiments shown in FIG. 2 and FIG. 3. Implementation principles and technical effects thereof are similar and are not described herein again.

The transmitting device according to Embodiment 3 of the present invention has a same structure as the transmitting device according to Embodiment 2.

On the basis of the transmitting device according to Embodiment 2 of the present invention, in Embodiment 3 of the transmitting device according to the embodiments, the determining module 11 is further configured to: before the transmitting device sends data to the receiving device, determine first receive power at which a first communication frame is received and second receive power at which a second communication frame is received, acquire first transmit power from the first communication frame, and acquire a clear channel assessment threshold from the second communication frame, where the first communication frame is a communication frame that is sent by a first wireless communications device to a second wireless communications device in the communication pair, and the second communication frame is a communication frame that is sent by the second wireless communications device to the first wireless communications device in the communication pair; determine a first path loss between the transmitting device and the first wireless communications device according to the first receive power and the first transmit power, and determine a second path loss between the transmitting device and the second wireless communications device according to the second receive power and the first transmit power; and determine, according to the first path loss, the second path loss, and the clear channel assessment threshold, transmit power needed for sending the data.

The maintaining module 14 is configured to maintain the state machine shown in FIG. 9.

The transmitting device in this embodiment may be configured to execute the technical solution of the method embodiment shown in FIG. 4. Implementation principles and technical effects thereof are similar and are not described herein again.

Figure 12:
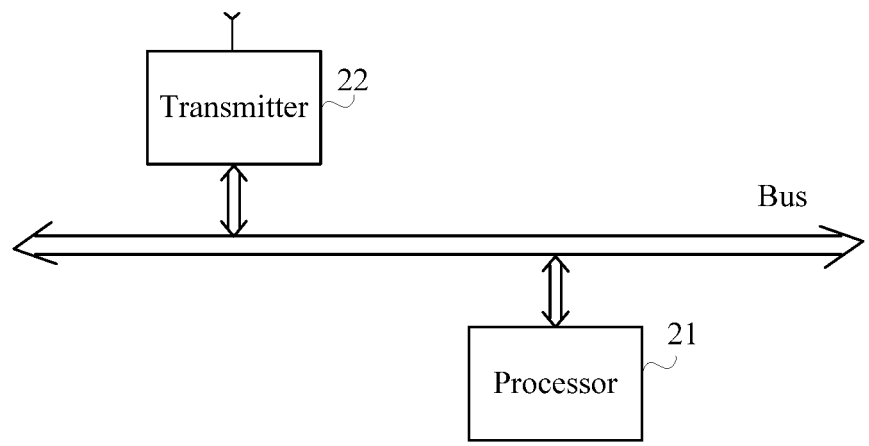
FIG. 12 is a schematic structural diagram of a transmitting device according to Embodiment 1.

FIG. 12 is a schematic structural diagram of a transmitting device according to Embodiment 1 of the present invention. As shown in FIG. 12, the transmitting device in this embodiment may include: a processor 21 and a transmitter 22.

The processor 21 is configured to determine a busy/idle state of a wireless communications channel and a communication status of a receiving device before a transmitting device sends data to the receiving device, where the transmitting device is a wireless access node or the transmitting device is a station, and the receiving device is a wireless access node or the receiving device is a station.

The transmitter 22 is configured to send the data to the receiving device if the wireless communications channel is in a busy state and the receiving device is in an idle communication state.

The transmitting device in this embodiment may be configured to execute the technical solution of the method embodiment shown in FIG. 1. Implementation principles and technical effects thereof are similar and are not described herein again.

Figure 13:
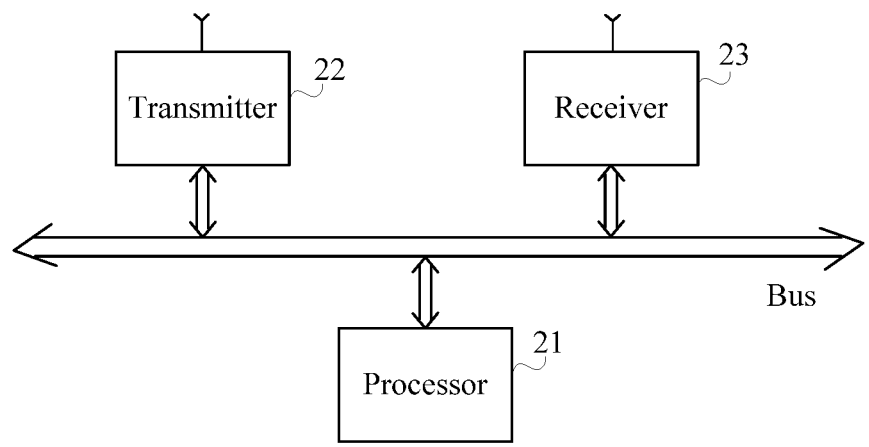
FIG. 13 is a schematic structural diagram of a transmitting device according to Embodiment 2.

FIG. 13 is a schematic structural diagram of a transmitting device according to Embodiment 2 of the present invention. As shown in FIG. 13, on the basis of the transmitting device shown in FIG. 12, the transmitting device in this embodiment may further include a receiver 23.

The processor 21 is further configured to: determine the communication status of the receiving device by searching a communication status table, where the communication status table includes a communication pair that is performing communication on the wireless communications channel; maintain the communication status table according to the communication frame before the processor 21 searches the communication status table; determine, according to identification information of the two communication parties, the communication pair that is performing communication on the wireless communications channel, and add a correspondence of the communication pair into the communication status table; and when duration over which the wireless communications channel is occupied expires, delete the correspondence of the communication pair from the communication status table.

The receiver 23 is configured to: before the processor 21 searches the communication status table, receive a communication frame sent by at least one wireless communications device in the communication pair, where the at least one wireless communications device is a wireless access node or the at least one wireless communications device is a station.

The transmitting device in this embodiment may be configured to execute the technical solutions of the method embodiments shown in FIG. 2 and FIG. 3. Implementation principles and technical effects thereof are similar and are not described herein again.

The transmitting device according to Embodiment 3 has a same structure as the transmitting device according to Embodiment 2 of the present invention.

On the basis of the transmitting device according to Embodiment 2, in Embodiment 3 of the transmitting device according to the present invention, the processor 21 is further configured to: before the transmitting device sends data to the receiving device, determine first receive power at which a first communication frame is received and second receive power at which a second communication frame is received, acquire first transmit power from the first communication frame, and acquire a clear channel assessment threshold from the second communication frame, where the first communication frame is a communication frame that is sent by a first wireless communications device to a second wireless communications device in the communication pair, and the second communication frame is a communication frame that is sent by the second wireless communications device to the first wireless communications device in the communication pair; determine a first path loss between the transmitting device and the first wireless communications device according to the first receive power and the first transmit power, and determine a second path loss between the transmitting device and the second wireless communications device according to the second receive power and the first transmit power; determine, according to the first path loss, the second path loss, and the clear channel assessment threshold, transmit power needed for sending the data; and maintain the state machine shown in FIG. 9.

The transmitting device in this embodiment may be configured to execute the technical solution of the method embodiment shown in FIG. 4. Implementation principles and technical effects thereof are similar and are not described herein again.

Persons of ordinary skill in the art may understand that all or some of the steps of the method embodiments may be implemented by a program instructing related hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:
1. A method, comprising:
   determining, by a transmitting device, a state of a wireless communications channel, the state of the wireless com- munication channel comprising a busy state or an idle state, the transmitting device being a wireless access node or a station;

determining, by the transmitting device in response to a determination that the wireless communications channel is in the busy state, a communication status of a receiving device by searching a communication status table, the communication status table comprising identification information of a first wireless communications device of a communication pair and identification information of a second wireless communications device of the communication pair, the communication pair performing communication on the wireless communications channel, the communication status of the receiving device comprising a busy communication status or an idle communication status, and the receiving device being a wireless access node or a station; and determining, by the transmitting device, a first receive power at which a first communication frame is received and a second receive power at which a second communication frame is received;

acquiring a first transmit power from the first communication frame, and acquiring a clear channel assessment threshold from the second communication frame, wherein the first communication frame is sent by the first wireless communications device to the second wireless communications device in the communication pair, and the second communication frame is sent by the second wireless communications device to the first wireless communications device in the communication pair;

determining, by the transmitting device, a first path loss between the transmitting device and the first wireless communications device according to the first receive power and the first transmit power, and determining a second path loss between the transmitting device and the second wireless communications device according to the second receive power and the first transmit power;

determining, by the transmitting device, a transmit power for sending data according to the first path loss, the second path loss, and the clear channel assessment threshold; and sending, by the transmitting device to the receiving device, the data according to the transmit power and in response to the determination that the wireless communications channel is in the busy state and a determination that the communication status of the receiving device is the idle communication status.

2. The method according to claim 1, wherein determining the communication status of the receiving device by searching the communication status table comprises:

in response to the receiving device being recorded in the communication status table, determining that the receiving device is in the busy communication status; and in response to the receiving device not being recorded in the communication status table, determining that the receiving device is in the idle communication status.

3. The method according to claim 1, wherein searching the communication status table comprises:

receiving, by the transmitting device, the first communication frame sent by the first wireless communications device, wherein the first wireless communications device is a wireless access node or a station; and maintaining, by the transmitting device, the communication status table according to the first communication frame.

4. The method according to claim 3, wherein:

the first communication frame comprises the identification information of the first wireless communications device and the identification information of the second wireless communications device and a duration over which the wireless communications channel is occupied; and maintaining the communication status table according to the first communication frame comprises:

determining, by the transmitting device according to the identification information of the first wireless communications device and the identification information of the second wireless communications device, that the communication pair that is performing communication on the wireless communications channel, and adding a correspondence of the communication pair into the communication status table; and when the duration over which the wireless communications channel is occupied expires, deleting, by the transmitting device, the correspondence of the communication pair from the communication status table.

5. The method according to claim 3, wherein the first communication frame is a request to send frame, and the second communication frame is a clear to send frame.

6. The method according to claim 3, wherein the first communication frame is a transmit power control request frame, and the second communication frame is a transmit power control report frame.

7. A transmitting device, comprising:

a processor;

a non-transitory computer-readable storage medium storing a program to be executed by the processor, the program comprising instructions for:

determining a state of a wireless communications channel, the state of the wireless communication channel comprising a busy state or an idle state;

determining, in response to determining that the wireless communications channel is in the busy state, a communication status of a receiving device by searching a communication status table, the communication status table comprising identification information of a first wireless communications device of a communication pair and identification information of a second wireless communications device of the communication pair, the communication pair performing communication on the wireless communications channel, the communication status of the receiving device comprising a busy communication status or an idle communication status, and the receiving device being a wireless access node or a station;

determining a first receive power at which a first communication frame is received and a second receive power at which a second communication frame is received;

acquiring first transmit power from the first communication frame, and acquiring a clear channel assessment threshold from the second communication frame, wherein the first communication frame is sent by the first wireless communications device to the second wireless communications device in the communication pair, and the second communication frame is sent by the second wireless communications device to the first wireless communications device in the communication pair;

determining a first path loss between the transmitting device and the first wireless communications device according to the first receive power and the first transmit power, and determining a second path loss between the transmitting device and the second wireless communications device according to the second receive power and the first transmit power; and determining a transmit power for sending data, according to the first path loss, the second path loss, and the clear channel assessment threshold;

a transmitter, configured to send the data to the receiving device according to the transmit power and in response to the determination, by the processor, that the wireless communications channel is in the busy state and a determination, by the processor, that the communication status of the receiving device is the idle communication status; and wherein the transmitting device is a wireless access node or a station.

8. The transmitting device according to claim 7, wherein the program further comprises instructions for:

determining, in response to the receiving device being recorded in the communication status table, that the receiving device is in the busy communication status; and determining, in response to the receiving device not being recorded in the communication status table, that the receiving device is in the idle communication status.

9. The transmitting device according to claim 7, further comprising:

a receiver, configured to, before searching, by the processor, the communication status table, receive the first communication frame sent by the first wireless communications device in the communication pair, wherein the first wireless communications device is a wireless access node or a station; and wherein the program further comprises instructions for maintaining the communication status table according to the first communication frame before searching the communication status table.

10. The transmitting device according to claim 9, wherein:

the first communication frame comprises identification information of the first wireless communications device and the identification information of the second wireless communications device and a duration over which the wireless communications channel is occupied; and the program further comprises instructions for:

determining, according to the identification information of the first wireless communications device and the identification information of the second wireless communications device, that the communication pair is performing communication on the wireless communications channel, and adding a correspondence of the communication pair into the communication status table; and in response to the duration over which the wireless communications channel is occupied expiring, deleting the correspondence of the communication pair from the communication status table.

11. The transmitting device according to claim 9, wherein the first communication frame is a request to send frame, and the second communication frame is a clear to send frame.

12. The transmitting device according to claim 9, wherein the first communication frame is a transmit power control request frame, and the second communication frame is a transmit power control report frame.

* * * * *